United States Patent
Zhao et al.

(10) Patent No.: US 10,103,643 B2
(45) Date of Patent: Oct. 16, 2018

(54) SPACE VECTOR MODULATION FOR MATRIX CONVERTER AND CURRENT SOURCE CONVERTER

(71) Applicant: Murata Manufacturing Co., Ltd., Nagaokakyo-shi, Kyoto-fu (JP)

(72) Inventors: Tao Zhao, Markham (CA); Dewei Xu, Markham (CA); Jahangir Afsharian, Markham (CA); Bing Gong, Markham (CA); Zhihua Yang, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/518,590

(22) PCT Filed: Oct. 28, 2015

(86) PCT No.: PCT/US2015/057887
§ 371 (c)(1),
(2) Date: Apr. 12, 2017

(87) PCT Pub. No.: WO2016/069791
PCT Pub. Date: May 6, 2016

(65) Prior Publication Data
US 2017/0279370 A1 Sep. 28, 2017

Related U.S. Application Data

(60) Provisional application No. 62/069,815, filed on Oct. 28, 2014.

(51) Int. Cl.
*H02M 7/162* (2006.01)
*H02M 7/527* (2006.01)
(Continued)

(52) U.S. Cl.
CPC ......... *H02M 7/1626* (2013.01); *H02M 5/293* (2013.01); *H02M 5/297* (2013.01);
(Continued)

(58) Field of Classification Search
CPC .... H02M 7/162; H02M 7/1626; H02M 7/527; H02M 7/5387; H02M 5/293;
(Continued)

(56) References Cited

U.S. PATENT DOCUMENTS 6,671,195 B2 * 12/2003 Perreault ................. B60L 3/003
361/88
8,687,388 B2 * 4/2014 Jang ..................... H02M 1/4216
363/44

(Continued)

OTHER PUBLICATIONS

A Novel Sinewave in AC to DC Converter with High-Frequency Transformer Isolation. Tefanos Manias and Phoivos D. Ziogas, Member, IEEE.*

(Continued)

*Primary Examiner* — Yemane Mehari
(74) *Attorney, Agent, or Firm* — Keating & Bennett, LLP

(57) ABSTRACT

A converter includes a transformer including primary windings and secondary windings, switches connected to the primary windings, an output inductor connected to the secondary windings, and a controller connected to the switches. The controller turns the switches on and off based on dwell times calculated using space vector modulation with a reference current $\vec{I}_{ref}$ whose magnitude changes with time.

20 Claims, 14 Drawing Sheets

Isolated matrix rectifier

(51) Int. Cl.
*H02M 5/297* (2006.01)
*H02M 5/293* (2006.01)
*H02M 1/12* (2006.01)
*H02M 7/5387* (2007.01)

(52) U.S. Cl.
CPC .............. *H02M 7/527* (2013.01); *H02M 1/12* (2013.01); *H02M 2007/53876* (2013.01)

(58) Field of Classification Search
CPC ...... H02M 5/297; H02M 3/156–3/158; H02M 3/33507; H02M 3/33561; H02M 3/33569; H02M 1/12; H02M 2007/53876; Y02B 70/126; Y02B 70/1433; Y02B 70/1441
USPC ................... 363/15–19, 34, 37, 40
See application file for complete search history.

(56) References Cited

U.S. PATENT DOCUMENTS

| | | | |
|---|---|---|---|
| 2010/0165674 A1 | 7/2010 | Dai et al. | |
| 2011/0007534 A1* | 1/2011 | Gupta | H02M 5/297 363/126 |
| 2012/0299522 A1 | 11/2012 | Krah | |
| 2014/0176088 A1 | 6/2014 | Eckhardt et al. | |
| 2014/0292088 A1 | 10/2014 | Eichert et al. | |
| 2015/0016170 A1* | 1/2015 | Olarescu | H02M 7/00 363/132 |

OTHER PUBLICATIONS

Official Communication issued in International Patent Application No. PCT/US2015/057887, dated Feb. 4, 2016.
Wheeler et al., "Matrix Converters: A Technology Review", IEEE Transactions on Industrial Electronics, vol. 49, No. 2, Apr. 2002, pp. 276-288.
Alesina et al., "Analysis and Design of Optimum-Amplitude Nine-Switch Direct AC-AC Converters", IEEE Transactions on Power Electronics, vol. 4, No. 1, Jan. 1989, pp. 101-112.
Huber et al., "Space Vector Modulator for Forced Commutated Cycloconverters", Industry Applications Society Annual Meeting, 1989, pp. 871-876.
Huber et al., "Space Vector Modulated Three-Phase to Three-Phase Matrix Converter with Input Power Factor Correction", IEEE Transactions on Industry Applications, vol. 31, No. 6, Nov./Dec. 1995, pp. 1234-1246.
Ishiguro et al., "A Novel Control Method for Forced Commutated Cycloconverters Using Instantaneous Values of Input Line-to-Line Voltages", IEEE Transactions on Industrial Electronics, vol. 38, No. 3, Jun. 1991, pp. 166-172.
Holmes et al., "Implementation of a Controlled Rectifier Using AC-AC Matrix Converter Theory", IEEE Transactions on Power Electronics, vol. 7, No. 1, Jan. 1992, pp. 240-250.
Vlatkovic et al., "Digital-Signal-Processor-Based Control of Three-Phase Space Vector Modulated Converters", IEEE Transactions on Industrial Electronics, vol. 41, No. 3, Jun. 1994, pp. 326-332.
Manias et al., "A Novel Sinewave in AC to DC Converter with High-Frequency Transformer Isolation", IEEE Transactions on Industrial Electronics, vol. IE-32, No. 4, Nov. 1985, pp. 430-438.
Inagaki et al., "A New PWM Control Method for ac to dc Converters with High-Frequency Transformer Isolation", IEEE Transactions on Industry Applications, vol. 29, No. 3, May/Jun. 1993, pp. 486-492.
Vlatkovic et al., "A Zero-Voltage Switched, Three-Phase Isolated PWM Buck Rectifier", IEEE Transactions on Power Electronics, vol. 10, No. 2, Mar. 1995, pp. 148-157.
Garcia-Gil et al., "A Bidirectional and Isolated Three-Phase Rectifier With Soft-Switching Operation", IEEE Transactions on Industrial Electronics, vol. 52, No. 3, Jun. 2005, pp. 765-773.
Ratanapanachote et al., "A Digitally Controlled Switch Mode Power Supply Based on Matrix Converter", IEEE Transactions on Power Electronics, vol. 21, No. 1, Jan. 2006, pp. 124-130.
Wu, "PWM Current Source Inverters", High-Power Converters and AC Drives, Chapter 10, 2006, 31 pages.
Yan et al., "A Novel Absolute Value Logic SPWM Control Strategy Based on De-Re-Coupling Idea for High Frequency Link Matrix Rectifier", IEEE Transactions on Industrial Informatics, vol. 9, No. 2, May 2013, pp. 1188-1198.

* cited by examiner

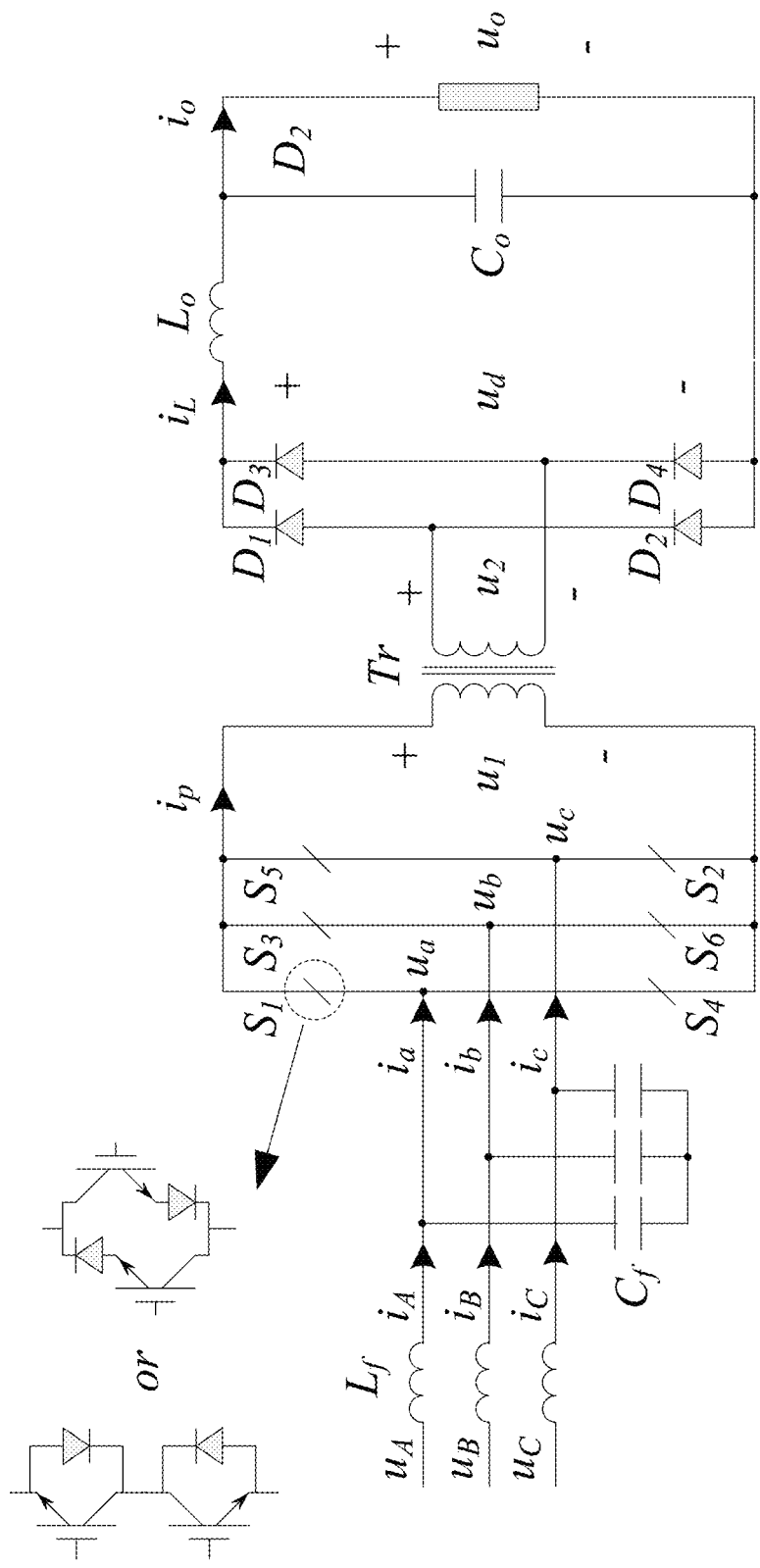
Fig. 1: Isolated matrix rectifier

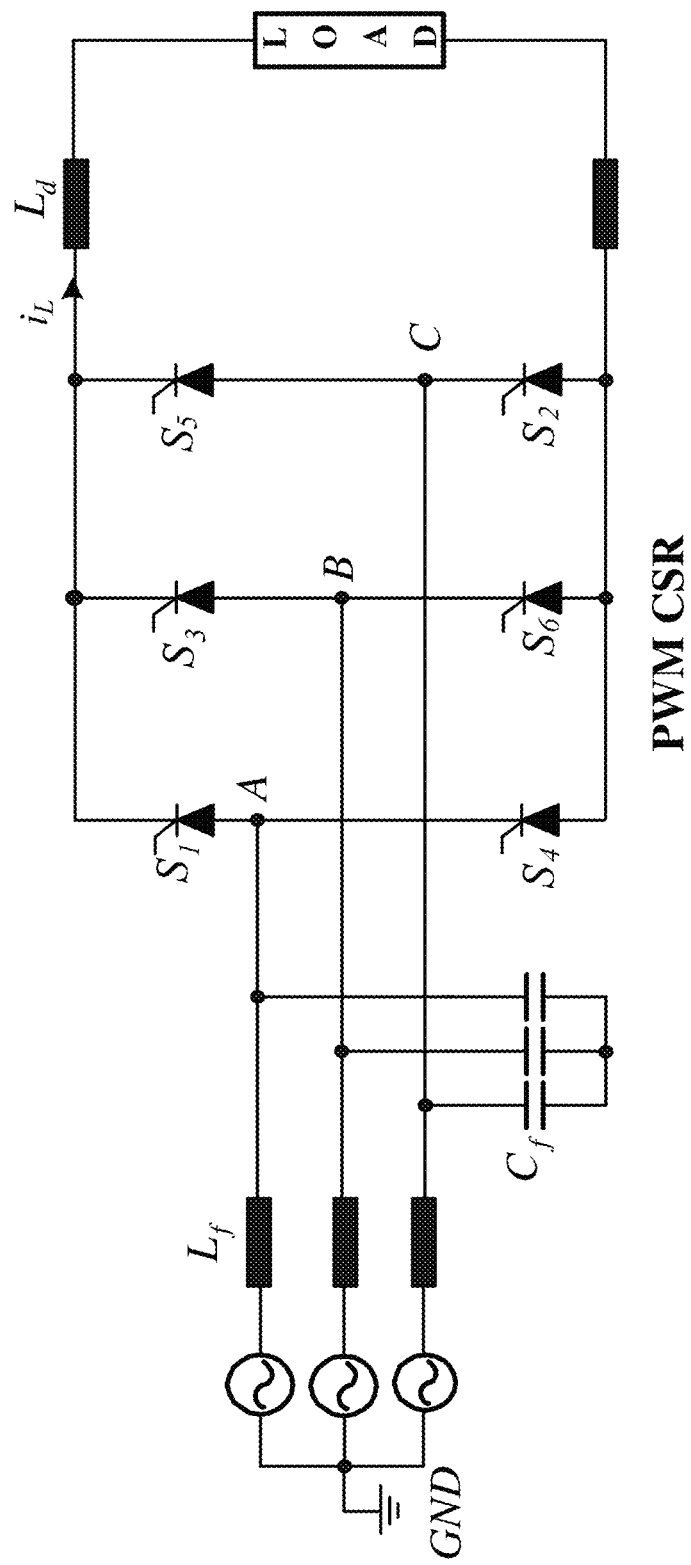
Fig. 2: PWM current-source rectifier (CSR)

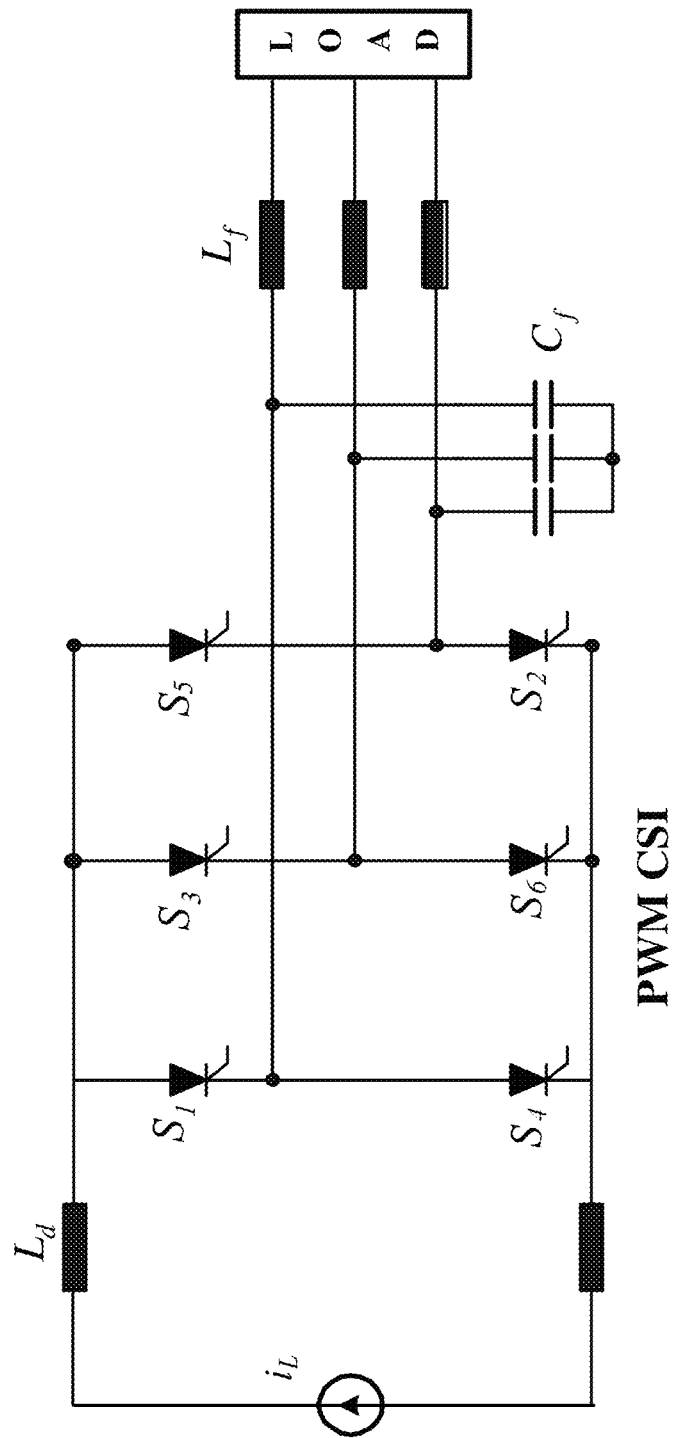
Fig. 3: PWM current-source inverter (CSI)

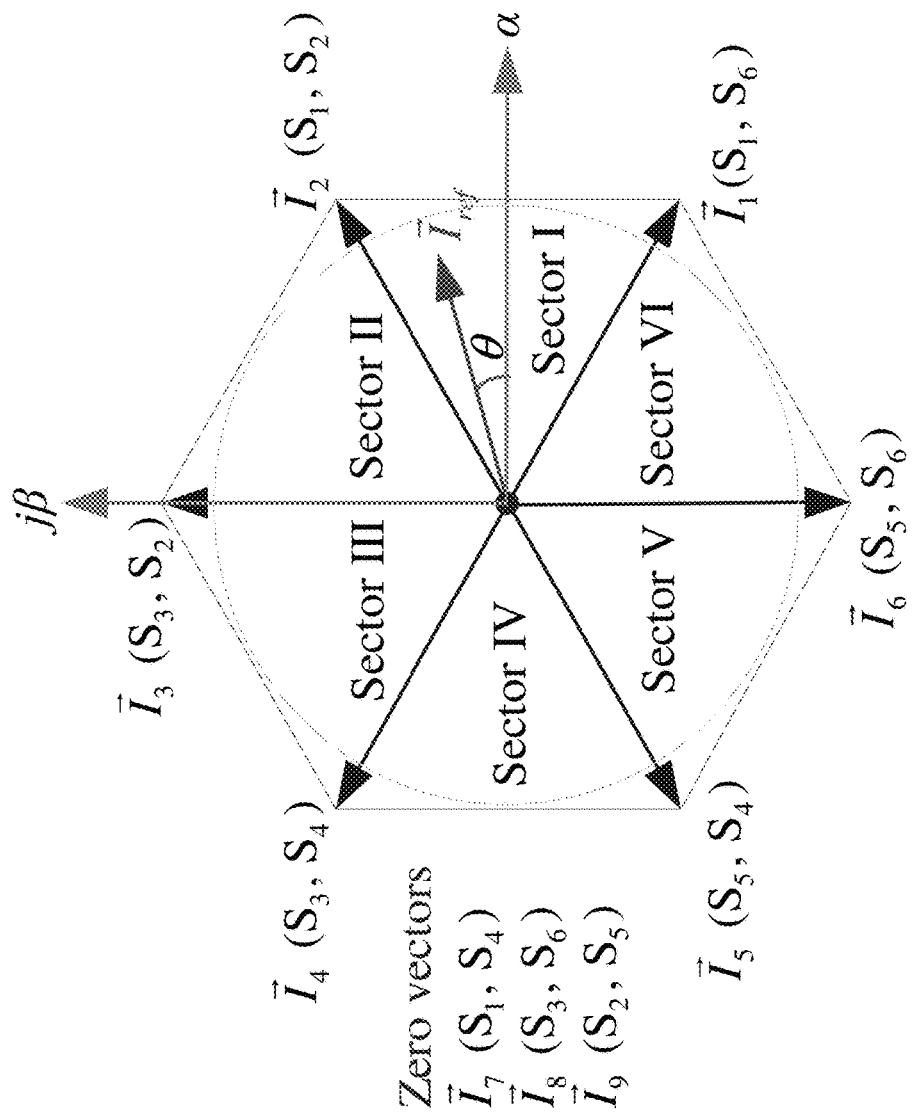
Fig. 4: Current space vector hexagon

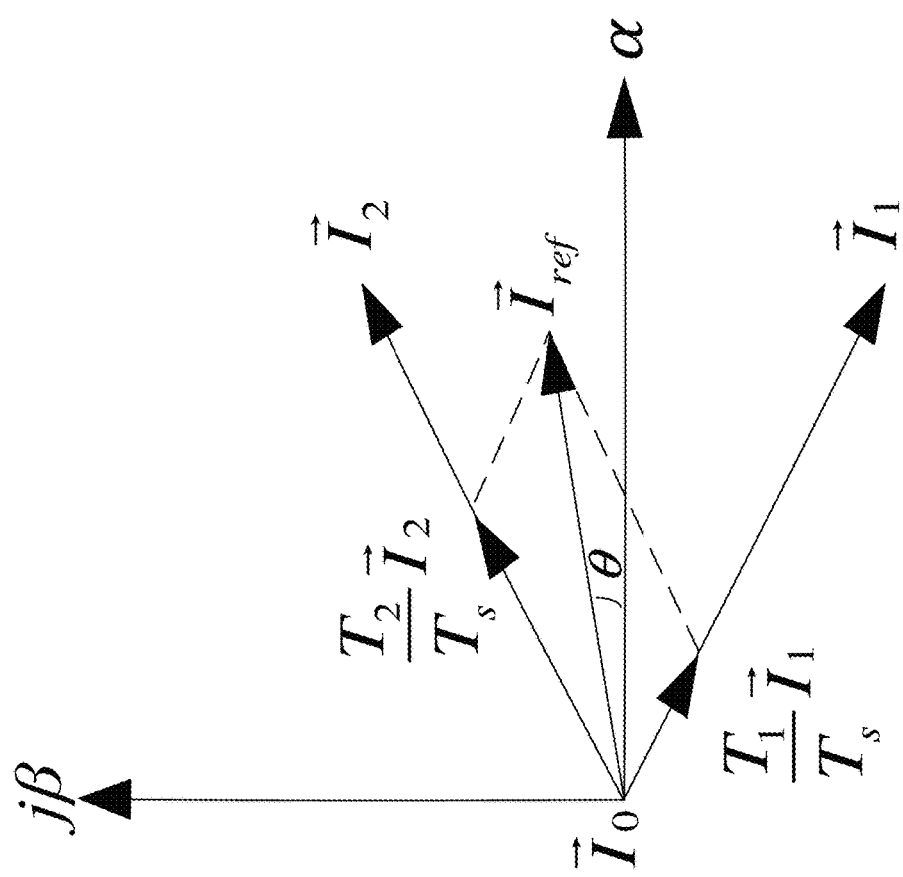
Fig. 5: Synthesis of $I_{ref}$ by $I_1$, $I_2$, and $I_0$

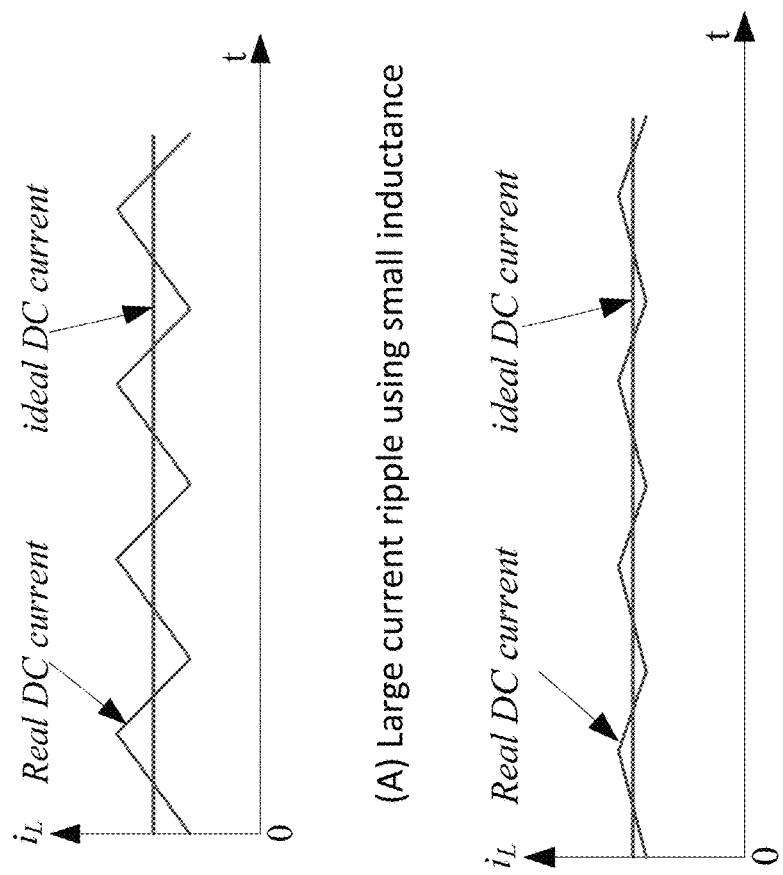
Fig. 6: Ideal DC current waveform and real current waveform

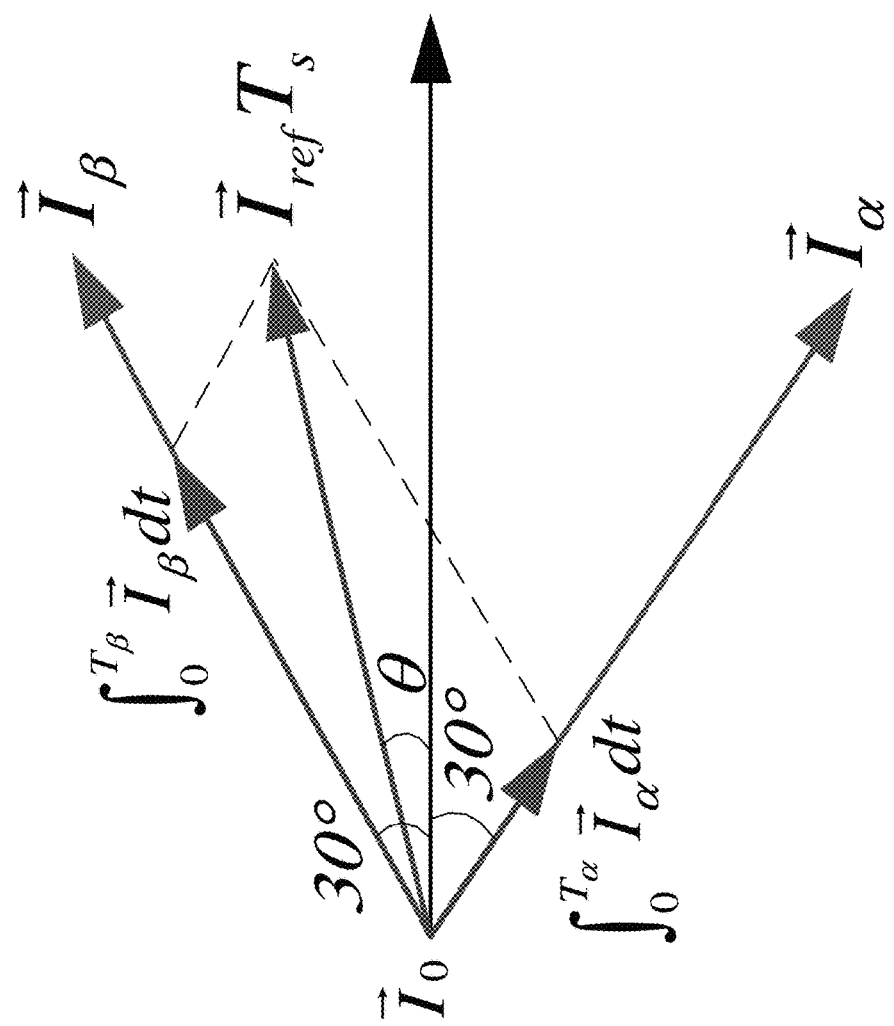
Fig. 7: Synthesis of $I_{ref}$ by $I_\alpha$, $I_\beta$, and $I_0$

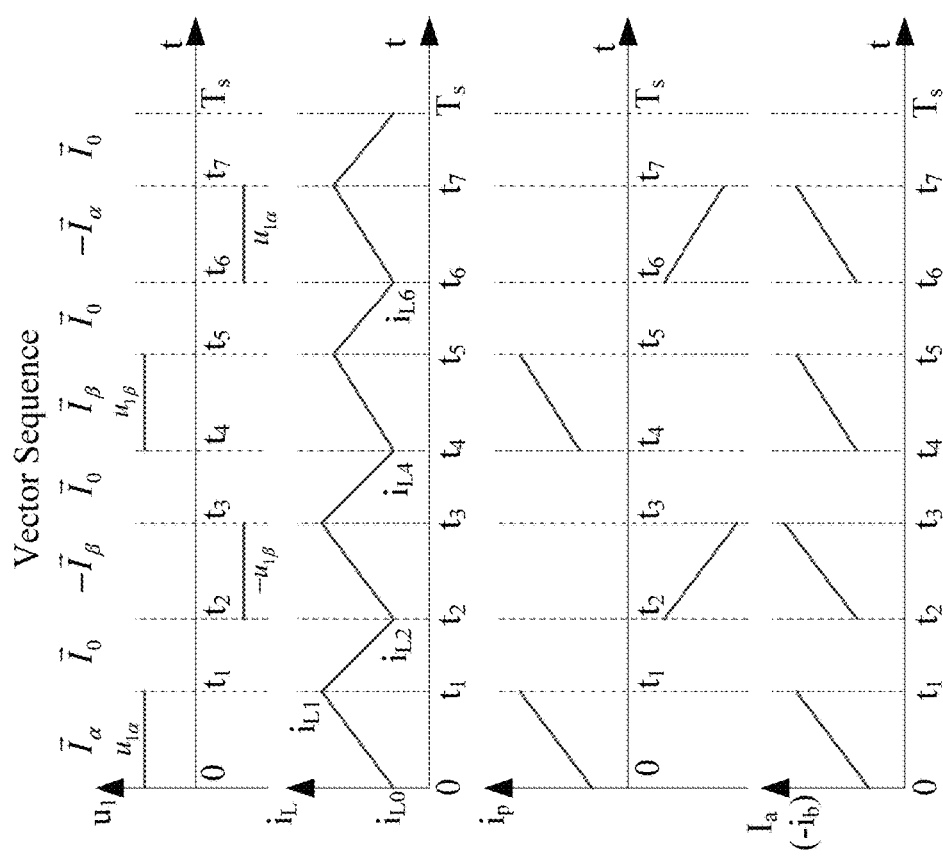
Fig. 8: Main waveforms of isolated matrix rectifier

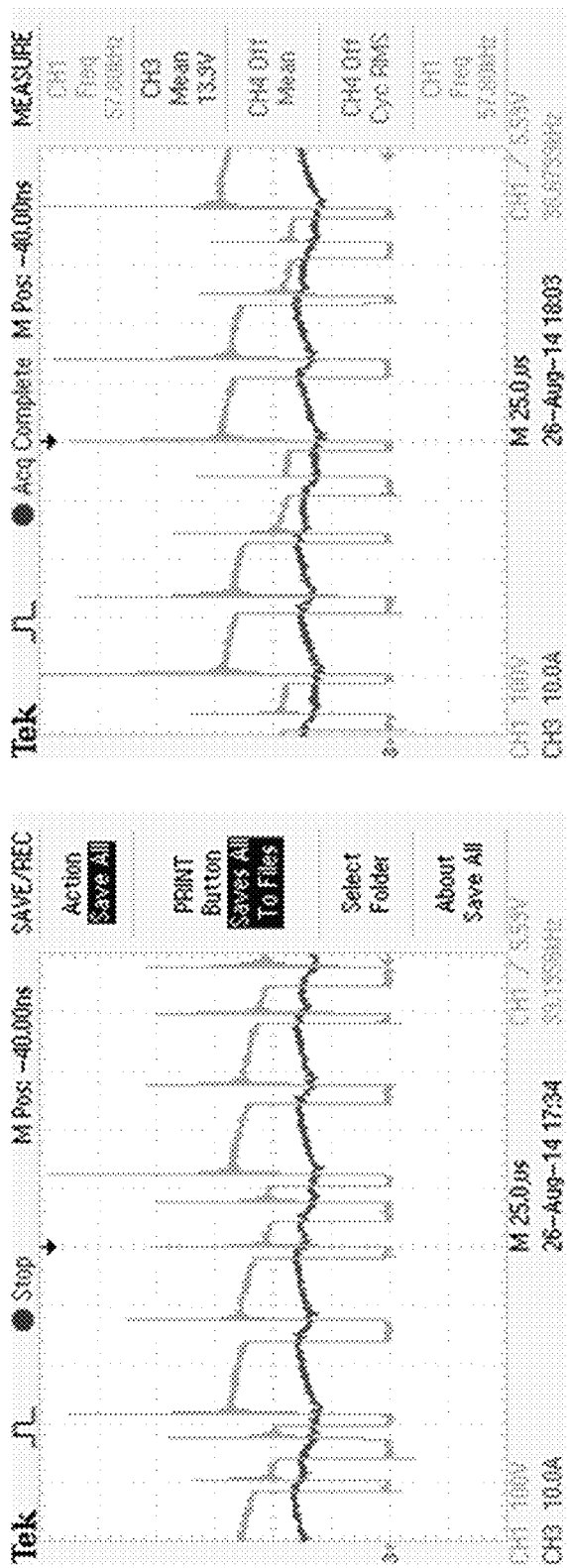
Fig. 9B: Diode rectifier output voltage $u_d$ (CH1) and DC inductor current $i_d$ (CH3) in CCM using improved SVM
Fig. 9A. Diode rectifier output voltage $u_d$ (CH1) and DC inductor current $i_d$ (CH3) in CCM using known SVM

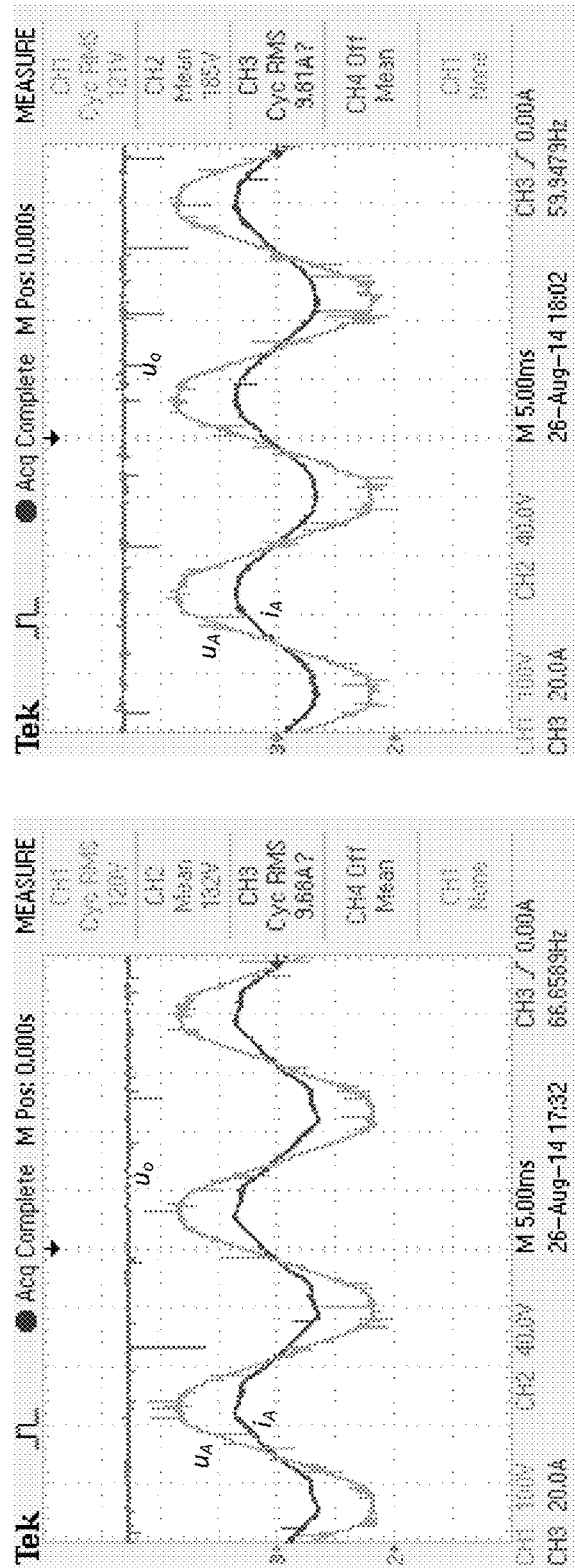
Fig. 9D: Line-side voltage $u_A$, current $i_A$, and output voltage $u_o$ using improved SVM
Fig. 9C: Line-side voltage $u_A$, current $i_A$, and output voltage $u_o$ using known SVM

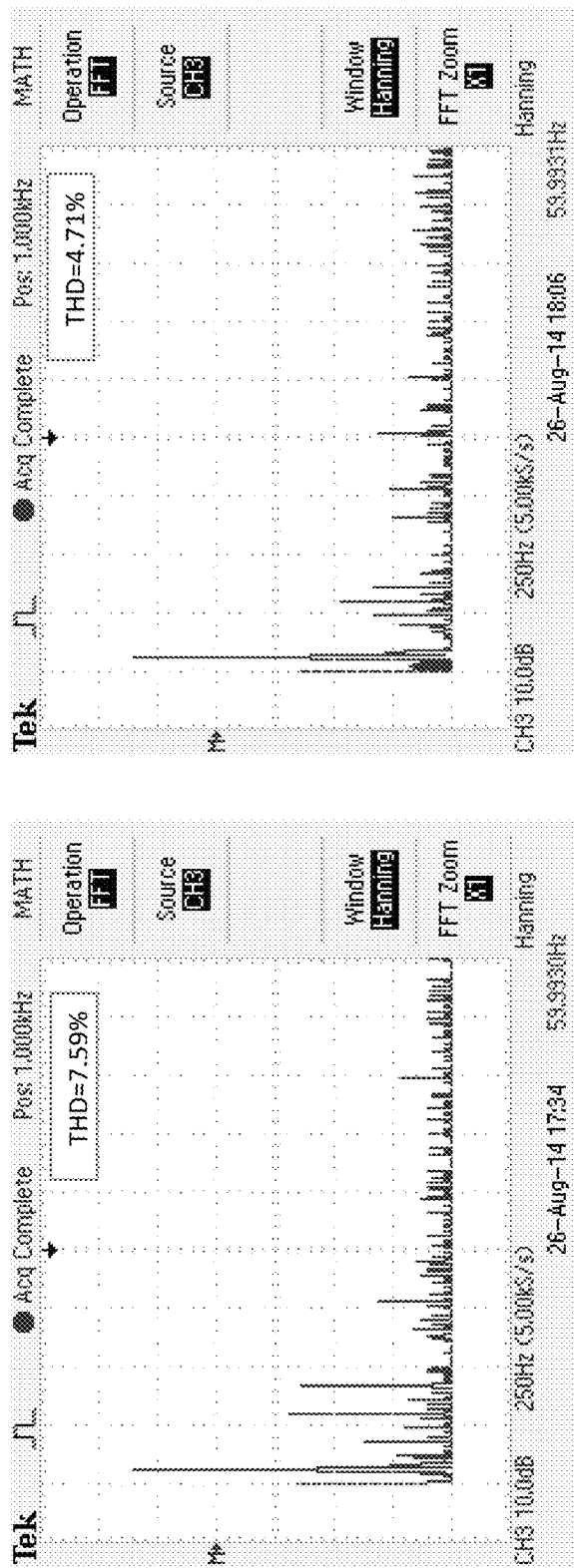

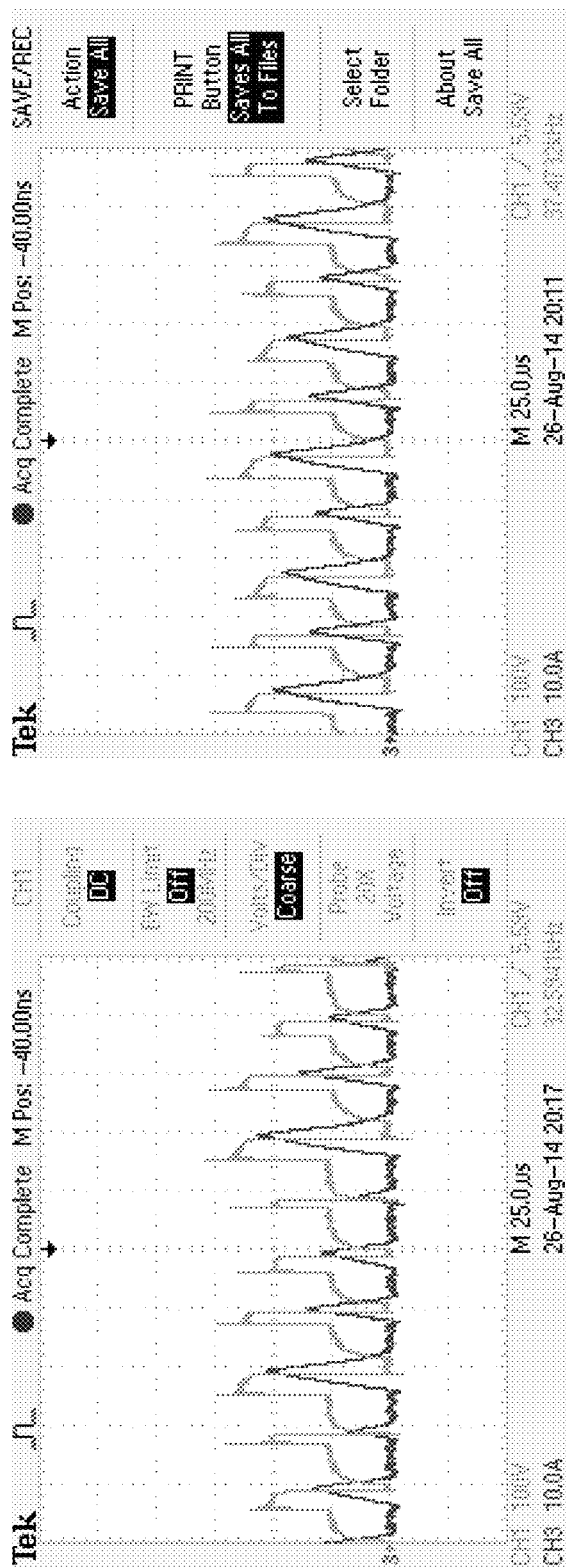
Fig. 10A: Diode rectifier output voltage $u_d$ (CH1) and DC inductor current $i_d$ (CH3) in DCM using known SVM
Fig. 10B: Diode rectifier output voltage $u_d$ (CH1) and DC inductor current $i_d$ (CH3) in DCM using improved SVM

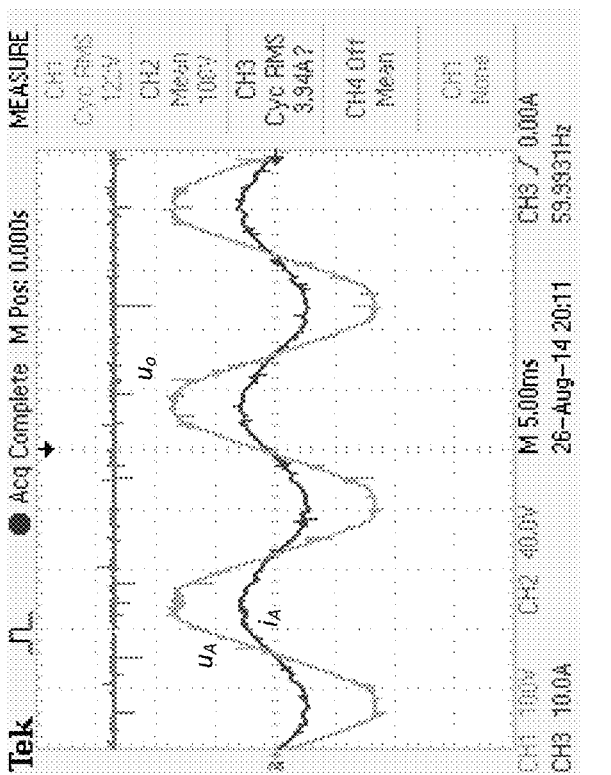
Fig. 10D: Line-side voltage $u_A$, current $i_A$ and output voltage $u_o$ using improved SVM
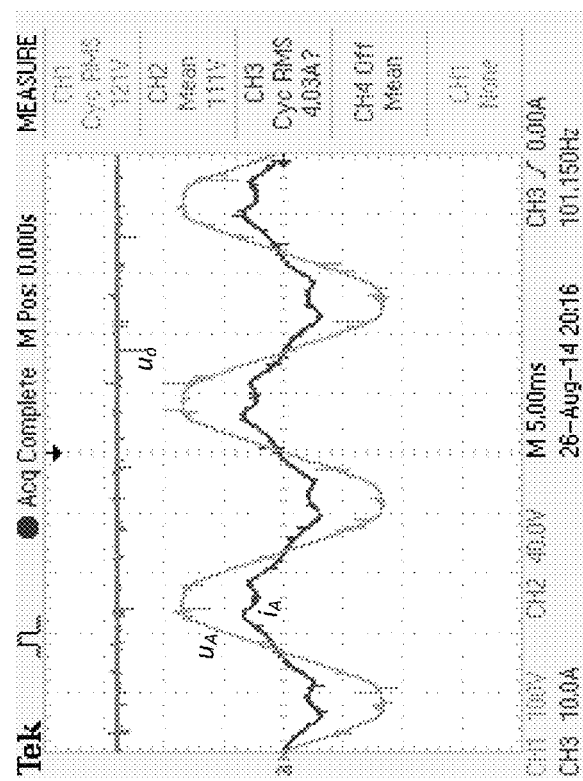
Fig. 10C: Line-side voltage $u_A$, current $i_A$ and output voltage $u_o$ using known SVM

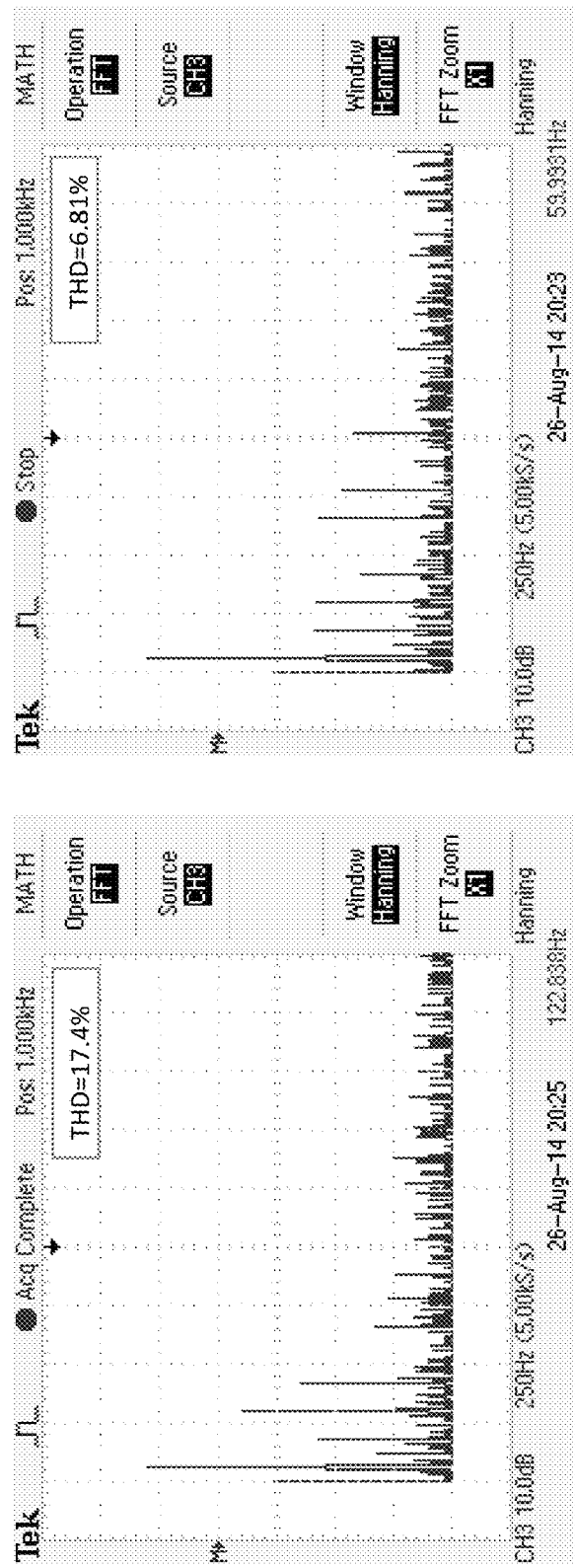
Fig. 10F: FFT of line-side current using improved SVM
Fig. 10E: FFT of line-side current using known SVM

SPACE VECTOR MODULATION FOR MATRIX CONVERTER AND CURRENT SOURCE CONVERTER

BACKGROUND OF THE INVENTION

1. Field of the Invention

The present invention relates to space vector modulation (SVM). More specifically, the present invention relates to an improved SVM algorithm that can be used with matrix rectifiers, current-source rectifiers, and current-source inverters.

2. Description of the Related Art

FIG. 1 shows an isolated matrix rectifier, FIG. 2 shows a current-source rectifier, and FIG. 3 shows a current-source inverter. Each of the circuits shown in FIGS. 1-3 can be used either with known SVM methods discussed in this section or with the novel SVM methods according to the preferred embodiments of the present invention discussed in the Detailed Description of Preferred Embodiments section below.

In FIG. 1, "line side" refers to the portion of the circuit on the left-hand side of the transformer $T_r$ that is connected to the line voltages $u_a$, $u_b$, $u_c$ for each of the phases A, B, C, and "load side" refers to the portion of the circuit on the right-hand side of the transformer $T_r$ that is connected to the output voltage $u_o$, i.e., the load. On the line side, the three-phase AC current is combined into single-phase AC current, and on the load side, the single-phase AC current is rectified by diodes $D_1$ to $D_4$ to provide DC current.

The isolated matrix rectifier includes a filter inductor $L_f$ and a filter capacitor $C_f$ that define a line-side filter that reduces the total harmonic distortion (THD), bi-directional switches $S_1$ to $S_6$ arranged in a bridge as a 3-phase-to-1-phase matrix converter, a transformer $T_r$ that provides high-voltage isolation between the line-side circuit and the load-side circuit, four diodes $D_1$ to $D_4$ arranged in a bridge to provide output rectification, an output inductor $L_o$, and an output capacitor $C_o$ that define a filter for the output voltage. Bi-directional switches are used in this isolated matrix rectifier to open or close the current path in either direction. As shown in FIG. 1, the bi-directional switch includes two uni-directional switches connected in parallel.

THD is defined as the ratio of the RMS amplitude of the higher harmonic frequencies to the RMS amplitude of the fundamental frequency:

$$THD = \frac{\sqrt{\sum_{k=2}^{\infty} V_k^2}}{V_1} \quad (1)$$

where $V_1$ is the amplitude of the fundamental frequency and $V_k$ is the amplitude of the higher harmonic frequencies. It is desirable to reduce the THD because the harmonic current can be injected back into the power system.

SVM is an algorithm for the pulse-width modulation (PWM) of the bi-directional switches $S_1$ to $S_6$. That is, SVM is used to determine when the bi-directional switches $S_1$ to $S_6$ should be turned on and off. The bi-directional switches $S_1$ to $S_6$ are controlled by digital signals, e.g., either one or zero. Typically, a one means the switch is on, and a zero means the switch is off. In PWM, the width of the on signal, which controls how long a switch is turned on, is modulated, or changed.

In known SVM, the main assumption is that the DC current is constant, which requires that the load-side inductor $L_o$ should be infinite in theory and that the power converter should be only used in continuous-conduction mode (CCM) operation. CCM occurs when the current through the load-side inductor $L_o$ is always above zero. In contrast to CCM, discontinuous-conduction mode (DCM) occurs when the current through the load-side inductor $L_o$ can be zero. The problem with using known SVM with DCM is large THD, as shown in FIG. 10E. It is impossible to provide an infinite load-side inductor $L_o$ in practice. Although it is possible to provide a load-side inductor $L_o$ with a very large inductance, doing so requires providing a large inductor that makes design difficult. It is impractical to assume that a power converter will only be used in CCM operation in any application that includes light-load conditions in which the power converter can be in DCM operation.

For the isolated matrix rectifier shown in FIG. 1, a switching function $S_i$ can be defined as:

$$S_i = \begin{cases} 1, S_i \text{ turn on} \\ 0, S_i \text{ turn off} \end{cases} i \in \{1, 2, 3, 4, 5, 6\} \quad (2)$$

where $S_i$ is the switching function for the $i^{th}$ switch. For example, if $S_1=1$, then switch $S_1$ is on, and if $S_1=0$, then switch $S_1$ is off.

Only two switches can be turned on at the same time to define a single current path. For example, if switches $S_1$ and $S_6$ are on, a single current path is defined between phases A and B through the transformer $T_r$. If only two switches can conduct at the same time, with one switch in the top half of the bridge ($S_1$, $S_3$, $S_5$) and with the other switch in the bottom half of the bridge ($S_2$, $S_4$, $S_6$), then there are nine possible switching states as listed in Tables 1 and 2, including six active switching states and three zero switching states. In Table 1, line currents $i_a$, $i_b$, $i_c$ are the currents in phases A, B, C, and the line-side current $i_p$ is the current through the primary winding of the transformer $T_r$. In Table 2, the transformer turns ratio k is assumed to be 1 so that the inductor current $i_L$ is equal to the line-side current $i_p$.

TABLE 1

Space Vectors, Switching States, and Phase Currents

| Space Vector | $S_1$ | $S_2$ | $S_3$ | $S_4$ | $S_5$ | $S_6$ | $i_a$ | $i_b$ | $i_c$ |
|---|---|---|---|---|---|---|---|---|---|
| $I_1$ | 1 | 0 | 0 | 0 | 0 | 1 | $i_p$ | $-i_p$ | 0 |
| $I_2$ | 1 | 1 | 0 | 0 | 0 | 0 | $i_p$ | 0 | $-i_p$ |
| $I_3$ | 0 | 1 | 1 | 0 | 0 | 0 | 0 | $i_p$ | $-i_p$ |
| $I_4$ | 0 | 0 | 1 | 1 | 0 | 0 | $-i_p$ | $i_p$ | 0 |
| $I_5$ | 0 | 0 | 0 | 1 | 1 | 0 | $-i_p$ | 0 | $i_p$ |
| $I_6$ | 0 | 0 | 0 | 0 | 1 | 1 | 0 | $-i_p$ | $i_p$ |
| $I_7$ | 1 | 0 | 0 | 1 | 0 | 0 | 0 | 0 | 0 |
| $I_8$ | 0 | 0 | 1 | 0 | 0 | 1 | 0 | 0 | 0 |
| $I_9$ | 0 | 1 | 0 | 0 | 1 | 0 | 0 | 0 | 0 |

TABLE 2

Space Vectors, Switching States, and Phase Currents

| Space Vector | Switching States | | | | | | $i_a$ | $i_b$ | $i_c$ |
|---|---|---|---|---|---|---|---|---|---|
| | $S_1$ | $S_2$ | $S_3$ | $S_4$ | $S_5$ | $S_6$ | | | |
| $I_1$ | 1 | 0 | 0 | 0 | 0 | 1 | $i_L$ | $-i_L$ | 0 |
| $I_2$ | 1 | 1 | 0 | 0 | 0 | 0 | $i_L$ | 0 | $-i_L$ |
| $I_3$ | 0 | 1 | 1 | 0 | 0 | 0 | 0 | $i_L$ | $-i_L$ |
| $I_4$ | 0 | 0 | 1 | 1 | 0 | 0 | $-i_L$ | $i_L$ | 0 |
| $I_5$ | 0 | 0 | 0 | 1 | 1 | 0 | $-i_L$ | 0 | $i_L$ |
| $I_6$ | 0 | 0 | 0 | 0 | 1 | 1 | 0 | $-i_L$ | $i_L$ |
| $I_7$ | 1 | 0 | 0 | 1 | 0 | 0 | 0 | 0 | 0 |
| $I_8$ | 0 | 0 | 1 | 0 | 0 | 1 | 0 | 0 | 0 |
| $I_9$ | 0 | 1 | 0 | 0 | 1 | 0 | 0 | 0 | 0 |

The active and zero switching states can be represented by active and zero vectors. A vector diagram is shown in FIG. 4, with the six active vectors $\vec{I}_1 \sim \vec{I}_6$ and the three zero vectors $\vec{I}_7 \sim \vec{I}_9$. The active vectors $\vec{I}_1 \sim \vec{I}_6$ form a regular hexagon with six equal sectors I-VI, and the zero vectors $\vec{I}_7 \sim \vec{I}_9$ lie at the center of the hexagon.

The relationship between the vectors and the switching states can be derived as follows.

Because the three phases A, B, C are balanced:

$$i_a(t) + i_b(t) + i_c(t) = 0 \tag{3}$$

where $i_a(t)$, $i_b(t)$, and $i_c(t)$ are the instantaneous currents in the phases A, B, and C. Using equation (3), the three-phase currents $i_a(t)$, $i_b(t)$, and $i_c(t)$ can be transformed into two-phase currents in the α-β plane using the following transformation:

$$\begin{bmatrix} i_\alpha(t) \\ i_\beta(t) \end{bmatrix} = \frac{2}{3} \begin{bmatrix} 1 & -\frac{1}{2} & -\frac{1}{2} \\ 0 & -\frac{\sqrt{3}}{2} & -\frac{\sqrt{3}}{2} \end{bmatrix} \begin{bmatrix} i_a(t) \\ i_b(t) \\ i_c(t) \end{bmatrix} \tag{4}$$

where $i_\alpha(t)$, $i_\beta(t)$ are the instantaneous currents in the phases α, β. A current vector $I(t)$ can be expressed in the α-β plane as:

$$\vec{I}(t) = i_\alpha(t) + j i_\beta(t) \tag{5}$$

$$\vec{I}(t) = \frac{2}{3}[i_a(t)e^{j0} + i_b(t)e^{j2\pi/3} + i_c(t)e^{j4\pi/3}] \tag{6}$$

where j is the imaginary number and $e^{jx} = \cos x + j \sin x$. Then the active vectors in FIG. 4 are provided by:

$$\vec{I}_k = \frac{2}{\sqrt{3}} \frac{I_d}{k} e^{j((k-1)\frac{\pi}{3} - \frac{\pi}{6})} \text{ for } k = 1, 2, \ldots, 6 \tag{7}$$

The isolated matrix rectifier's controller determines a reference current $\vec{I}_{ref}$ and calculates the on and off times of the switches $S_1$ to $S_6$ to approximate the reference current $\vec{I}_{ref}$ to produce the line-side current $i_a$ and $i_b$. The reference current $\vec{I}_{ref}$ preferably is sinusoidal with a fixed frequency and a fixed magnitude: $\vec{I}_{ref} = I_{ref} e^{j\theta}$. The fixed frequency is preferably the same as the fixed frequency of each of the three-phase $i_a(t)$, $i_b(t)$, and $i_c(t)$ to reduce harmful reflections. The controller determines the magnitude of the reference current $\vec{I}_{ref}$ to achieve a desired output voltage $u_o$. That is, the controller can regulate the output voltage $u_o$ by varying the magnitude of the reference current $\vec{I}_{ref}$.

The reference current $\vec{I}_{ref}$ moves through the α-β plane. The angle θ is defined as the angle between the α-axis and the reference current $\vec{I}_{ref}$. Thus, as the angle θ changes, the reference current $\vec{I}_{ref}$ sweeps through the different sectors.

The reference current $\vec{I}_{ref}$ can be synthesized by using combinations of the active and zero vectors. Synthesized means that the reference current $\vec{I}_{ref}$ can be represented as a combination of the active and zero vectors. The active and zero vectors are stationary and do not move in the α-β plane as shown in FIG. 4. The vectors used to synthesize the reference current $\vec{I}_{ref}$ change depending on which sector the reference current $\vec{I}_{ref}$ is located. The active vectors are chosen by the active vectors defining the sector. The zero vector is chosen for each sector by determining which on switch the two active vectors have in common and choosing the zero vector that also includes the same on switch. Using the zero vectors allows the magnitude of the line-side current $i_p$ to be adjusted.

For example, consider when the current reference $\vec{I}_{ref}$ is in sector I. The active vectors $\vec{I}_1$ and $\vec{I}_2$ define sector I. The switch $S_1$ is on for both active vectors $\vec{I}_1$ and $\vec{I}_2$. The zero vector $\vec{I}_7$ also has the switch $S_1$ on. Thus, when the reference current $\vec{I}_{ref}$ is located in sector I, the active vectors $\vec{I}_1$ and $\vec{I}_2$ and zero vector $\vec{I}_7$ are used to synthesize the reference current $\vec{I}_{ref}$, which provides the following equation, with the right-hand side of the equation resulting from vector $\vec{I}_7$ being a zero vector with zero magnitude:

$$\vec{I}_{ref} = \frac{T_1}{T_s} \vec{I}_1 + \frac{T_2}{T_s} \vec{I}_2 + \frac{T_7}{T_s} \vec{I}_7 = \frac{T_1}{T_s} \vec{I}_1 + \frac{T_2}{T_s} \vec{I}_2 \tag{8}$$

where $T_1$, $T_2$, and $T_0$ are the dwell times for the corresponding active switches and $T_s$ is the sampling period.

The dwell time is the on time of the corresponding switches. For example, $T_1$ is the on time of the switches $S_1$ and $S_6$ for the active vector $I_1$. Because switch $S_1$ is on for each of vectors $\vec{I}_1$, $\vec{I}_2$, and $\vec{I}_7$, the switch $S_1$ is on the entire sampling period $T_s$. The ratio $T_1/T_s$ is the duty cycle for the switch $S_6$ during the sampling period $T_s$.

The sampling period $T_s$ is typically chosen such that the reference current $\vec{I}_{ref}$ is synthesized multiple times per sector. For example, the reference current $\vec{I}_{ref}$ can be synthesized twice per sector so that the reference current $\vec{I}_{ref}$ is synthesized twelve times per cycle, where one complete cycle is when the reference current $\vec{I}_{ref}$ goes through sectors I-VI.

The dwell times can be calculated using the ampere-second balancing principle, i.e., the product of the reference current $\vec{I}_{ref}$ and sampling period $T_s$ equals the sum of the current vectors multiplied by the time interval of synthesizing space vectors. Assuming that the sampling period $T_s$ is sufficiently small, the reference current $\vec{I}_{ref}$ can be considered constant during sampling period $T_s$. The reference current $\vec{I}_{ref}$ can be synthesized by two adjacent active vectors and a zero vector. For example, when the reference current $\vec{I}_{ref}$ is in sector I as shown in FIG. 5, the reference current $\vec{I}_{ref}$ can be synthesized by vectors $\vec{I}_1$, $\vec{I}_2$, and $\vec{I}_7$. The ampere-second balancing equation is thus given by the following equations:

$$\vec{I}_{ref}T_s = \vec{I}_1 T_1 + \vec{I}_2 T_2 + \vec{I}_7 T_7 \quad (9)$$

$$T_s = T_1 + T_2 + T_7 \quad (10)$$

where $T_1$, $T_2$, and $T_7$ are the dwell times for the vectors $\vec{I}_1$, $\vec{I}_2$, and $\vec{I}_7$ and $T_s$ is sampling time. Then the dwell times are given by:

$$T_1 = mT_s \sin(\pi/6 - \theta) \quad (11)$$

$$T_2 = mT_s \sin(\pi/6 + \theta) \quad (12)$$

$$T_7 = T_s - T_1 - T_2 \quad (13)$$

where $$m = k\frac{I_{ref}}{i_L}, \quad (14)$$

$\theta$ is sector angle between current reference $\vec{I}_{ref}$ and $\alpha$-axis shown in FIG. 5, and k is the transformer turns ratio.

However, the above dwell time calculations are based on the assumption that the inductor current $i_L$ is constant. If the inductor current $i_L$ has ripples, the dwell time calculation based on these equations is not accurate. The larger the ripple, the larger the error will be. As a result, the THD of the line-side current will be increased. In actual applications, the load-side inductance is not infinite, and the current ripple always exists. As shown in FIG. 6A, if the load-side inductance is small, then the current ripple is too large to use known SVM. As shown in FIG. 6B, to provide acceptable waveforms and to reduce line-side THD, the load-side inductance must be very large to reduce the current ripple and to come as close as possible to a theoretical value.

Known SVM can also be applied to the current-source rectifier in FIG. 2 and to the current-source inverter in FIG. 3 using the same techniques as discussed above with respect to equations (9)-(14).

A large load-side inductance has the problems of large size, excessive weight, and high loss, for example. The current ripple in a practical inductor also has the problems in modulation signals using traditional SVM, including increased line-side THD. In addition, DCM is unavoidable when the load varies. Under light loads, the load-side inductor $L_o$ might be in DCM without a dummy load.

In known SVM for matrix rectifiers, current-source rectifiers, and current-source inverters, the DC current is assumed to be constant or the current ripple is assumed to be very small. Thus, known SVM includes at least the following problems:

1) The Load-side inductance must be large to maintain small current ripple.
2) As a result of 1) the Load-side inductor size must be large.
3) Current ripple increases the THD of the line-side current.
4) Line-side current THD is high at light load.
5) Known SVM can only be used in CCM operation.

SUMMARY OF THE INVENTION

To overcome the problems described above, preferred embodiments of the present invention provide an improved SVM with the following benefits:

1) Reduced load-side inductance.
2) Reduced load-side inductor size.
3) Decreased THD of the line-side current, even with large current ripple or light-load condition.
4) Improved SVM is capable of being used with both DCM and CCM modes.
5) Improved SVM is simple and is capable of being calculated in real time.

A preferred embodiment of the present invention provides a converter that includes a transformer including primary windings and secondary windings, switches connected to the primary windings, an output inductor connected to the secondary windings, and a controller connected to the switches. The controller turns the switches on and off based on dwell times calculated using space vector modulation with a reference current $\vec{I}_{ref}$ whose magnitude changes with time.

Another preferred embodiment of the present invention provides a corresponding space-vector-modulation method.

Preferably, the switches include six switches; the space vector modulation includes using six active switching states and three zero switching states; a current space is divided into six sectors by the six active switching states such that a vector with $\theta=0$ is located halfway between two of the active switching states; and magnitudes of the six active switching states change with time.

The controller preferably turns the six switches on and off based on dwell times that are calculated based on an ampere-second balance equation:

$$\vec{I}_{ref}T_s = \int_0^{T_\alpha} \vec{I}_\alpha dt + \int_0^{T_\beta} \vec{I}_\beta dt + \int_0^{T_o} \vec{I}_0 dt$$

where $\vec{I}_{ref} = I_{ref} e^{j\theta}$, $\theta$ is an angle between the reference current $\vec{I}_{ref}$ and the vector with $\theta=0$, $T_s$ is a sampling period, $\vec{I}_\alpha$, $\vec{I}_\beta$, $\vec{I}_0$, are three nearest adjacent active vectors to $\vec{I}_{ref}$, and $T_\alpha$, $T_\beta$, $T_0$ are dwell times of $\vec{I}_\alpha$, $\vec{I}_\beta$, $\vec{I}_0$. The controller preferably turns the six switches on and off based on a vector sequence $\vec{I}_\alpha$, $\vec{I}_0$, $-\vec{I}_\beta$, $\vec{I}_0$, $\vec{I}_\beta$, $\vec{I}_0$, $-\vec{I}_\alpha$, $\vec{I}_0$, during the sampling period $T_s$. The controller preferably turns the six switches on and off based on a timing sequence $T_\alpha/2$, $T_0/4$, $T_\beta/2$, $T_0/4$, $T_\beta/2$, $T_0/4$, $T_\alpha/2$, $T_0/4$, during the sampling period $T_s$.

Preferably, the controller calculates the dwell times using:

$$T_\alpha = \frac{-B + \sqrt{B^2 + AC \sin(\pi/6 - \theta)}}{A}$$

$$T_\beta = \frac{-B + \sqrt{B^2 + AC \sin(\pi/6 - \theta)}}{A} \cdot \frac{\sin(\pi/6 + \theta)}{\sin(\pi/6 - \theta)}$$

$$T_0 = T_s - T_\alpha - T_\beta$$

where $$A = (4u_{1\alpha}/k - u_o) + (4u_{1\beta}/k - u_o)\frac{\sin(\pi/6 + \theta)}{\sin(\pi/6 - \theta)}$$

$$B = 4L_o I_{L0} - 3u_o T_s/2$$

$$C = 8kL_o I_{ref} T_s$$

$u_{1\alpha}$ is a line-to-line voltage depending on the active switching state $\vec{I}_\alpha$, $u_{1\beta}$ is a line-to-line voltage depending on the active switching state $\vec{I}_\beta$, k is a transformer turns ratio, $u_o$ is an output voltage of the converter, $\theta$ is the angle between the reference current $\vec{I}_{ref}$ and the vector with θ=0, $L_o$ is an inductance of the output inductor, $I_{L0}$ is the current through inductor $L_o$ at a beginning of the sampling period $T_s$, $T_s$ is the sampling period, and $I_{ref}$ is a magnitude of the vector $\vec{I}_{ref}$.

The controller preferably calculates the dwell times using:

$$T_\alpha = 2\sqrt{\frac{kI_{ref}L_o T_s \sin(\pi/6-\theta)}{u_{1\alpha}/k - u_o}}$$

$$T_\beta = 2\sqrt{\frac{kL_o I_{ref} T_s \sin(\pi/6+\theta)}{u_{1\beta}/k - \mu_o}}$$

where k is a transformer turns ratio, $L_o$ is an inductance of the output inductor, $I_{ref}$ is the magnitude of the vector $\vec{I}_{ref}$, $T_s$ is the sampling period, θ is an angle between the reference current $\vec{I}_{ref}$ and the vector with θ=0, $u_{1\alpha}$ is a line-to-line voltage depending on the active switching state $\vec{I}_\alpha$, $u_{1\beta}$ is a line-to-line voltage depending on the active switching state $\vec{I}_\beta$, and $u_o$ is an output voltage of the converter.

The converter is preferably one of a matrix rectifier, a current-source rectifier, and a current-source inverter. The converter is preferably operated in a continuous-conduction mode or a discontinuous-conduction mode.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIG. 1 is a circuit diagram of an isolated matrix rectifier.
FIG. 2 is a circuit diagram of a current-source rectifier.
FIG. 3 is a circuit diagram of a current-source inverter.
FIG. 4 shows a current-space vector hexagon.
FIG. 5 shoes the synthesis of reference current $\vec{I}_{ref}$ using $I_1$ and $I_2$ using known SVM.
FIG. 6 shows ideal and real DC current waveforms.
FIG. 7 shows the synthesis of reference current $\vec{I}_{ref}$ using $I_\alpha$ and $I_\beta$ using SVM of a preferred embodiment of the present invention.
FIG. 8 shows the waveforms of the isolated matrix rectifier shown in FIG. 1.
FIGS. 9A, 9C, and 9E show waveforms of the isolated matrix rectifier shown in FIG. 1 in CCM using known SVM, and FIGS. 9B, 9D, and 9F show corresponding waveforms of the isolated matrix rectifier shown in FIG. 1 in CCM using SVM according to various preferred embodiments of the present invention.
FIGS. 10A, 10C, and 10E show waveforms of the isolated matrix rectifier shown in FIG. 1 in DCM using known SVM, and FIGS. 10B, 10D, and 10F show corresponding waveforms of the isolated matrix rectifier shown in FIG. 1 in DCM using SVM according to various preferred embodiments of the present invention.

DETAILED DESCRIPTION OF PREFERRED EMBODIMENTS

Preferred embodiments of the present invention improve the known SVM. The improved SVM is capable of being used with both DCM and CCM operation, is capable of being used with smaller load-side inductors, and reduces line-side THD.

As with the known SVM, the improved SVM includes nine switching states, including six active switching states and three zero switching states as shown in FIG. 4, that are used to synthesize the reference current $\vec{I}_{ref}$ as shown in FIG. 7. However, in the improved SVM, the six active switching states, although stationary, are assumed to change with time. That is, the magnitude of the active switching states changes with time which is true in actual application.

The reference current $\vec{I}_{ref}$ preferably is synthesized by the three nearest vectors $\vec{I}_\alpha$, $\vec{I}_\beta$, $\vec{I}_0$ as shown in FIG. 7, and the dwell time of each vector is $T_\alpha$, $T_\beta$, $T_0$. Here, (α, β) represent the subscript of the pair of active vectors in each sector such as (1,2) or (2,3) or (3,4) or (5,6) or (6,1). The dwell times preferably are calculated based on the principle of ampere-second balance. Because of current ripple, the inductor current is not constant, so the ampere-second balance of equation (9) becomes:

$$\vec{I}_{ref}T_s = \int_0^{T_\alpha} \vec{I}_\alpha dt + \int_0^{T_\beta} \vec{I}_\beta dt + \int_0^{T_0} \vec{I}_0 dt \qquad (15)$$

Applying equation (15) to the isolated matrix rectifier shown in FIG. 1, provides the following analysis. The following assumptions are made in the following analysis:
1) Transformer $T_r$ is ideal; and
2) In one sampling period $T_s$, phase voltages $u_a$, $u_b$, $u_c$ are constant.

Because of the isolation provided by the transformer, the output voltage of the matrix converter $u_1(t)$ must alternate between positive and negative with high frequency to maintain volt-sec balance. Thus, the preferred vector sequence in every sampling period $T_s$ is divided into eight segments as $\vec{I}_\alpha$, $\vec{I}_0$, $-\vec{I}_\beta$, $\vec{I}_0$, $\vec{I}_\beta$, $\vec{I}_0$, $-\vec{I}_\alpha$, $\vec{I}_0$, and the dwell time of each vector is respectively $T_\alpha/2$, $T_0/4$, $T_\beta/2$, $T_0/4$, $T_\beta/2$, $T_0/4$, $T_\alpha/2$, $T_0/4$. However, the sequence of the active vectors and zero vectors can be combined in different ways, and the dwell time for the zero vectors is not necessary to be divided equally. For example, the vector sequence could be six segments as $\vec{I}_\alpha$, $\vec{I}_\beta$, $\vec{I}_0$, $-\vec{I}_\beta$, $\vec{I}_0$, with dwell time $T_\alpha/2$, $T_\beta/2$, $T_0/2$, $T_\alpha/2$, $T_\beta/2$, $T_0/2$, respectively. Only the case with eight segments as $\vec{I}_\alpha$, $\vec{I}_0$, $-\vec{I}_\beta$, $\vec{I}_0$, $\vec{I}_\beta$, $\vec{I}_0$, $-\vec{I}_\alpha$, $\vec{I}_0$, and the dwell time of each vector with $T_\alpha/2$, $T_0/4$, $T_\beta/2$, $T_0/4$, $T_\beta/2$, $T_0/4$, $T_\alpha/2$, $T_0/4$ is used as an example to show how the dwell times can be calculated to eliminate the effect of the current ripple on load side. FIG. 8 shows the waveforms of the matrix converter output voltage $u_1(t)$ the inductor current $i_L(t)$, the matrix converter output current $i_p(t)$, and the phase current $i_a(t)$. The inductor current $i_L(t)$ at the time $t_0$, $t_1$, $t_2$, $t_3$, $t_4$, $t_5$, $t_6$, $t_7$, $t_8$, where $t_1$ and $(t_7-t_6)=T_\alpha/2$, $(t_3-t_2)$ and $(t_5-t_4)=T_\beta/2$, and the dwell time of the zero vectors are all $T_0/4$, can be described in equation (16):

$$I_{Li} = I_{Li-1} + \frac{u_{Li}}{L_o} \cdot (t_i - t_{i-1}) \quad i = 1, 2, 3, 4, 5, 6, 7, 8 \qquad (16)$$

where the $u_{Li}$ is the voltage of load-side inductor between times $t_{i-1}$ and $t_i$ and $L_o$ is the inductance of the load-side inductor $L_o$. The instantaneous value of the load-side inductor current is provided by:

$$i_L(t) = I_{Li-1} + \frac{u_{Li}}{L_o} \cdot (t - t_{i-1}) \quad t_{i-1} < t < t_i \qquad (17)$$

The output current $i_p$ of the matrix converter is provided by:

$$i_p(t) = \begin{cases} i_L(t)/k & u_1 > 0 \\ -i_L(t)/k & u_1 < 0 \end{cases} = g i_L(t)/k \qquad (18)$$

where k is turns ratio of the transformer and the sign function g is defined by:

$$g = \begin{cases} 1 & u_1 > 0 \\ -1 & u_1 < 0 \end{cases}, \qquad (19)$$

Using equation (18), equation (7) for the active vectors becomes:

$$\vec{I}_k = 2/\sqrt{3} i_p(t) e^{j((k-1)\pi/3 - \pi/6)} k=1,2,3,4,5,6 \qquad (20)$$

Substituting equations (17), (18), and (20) into the ampere-second balancing equation (15) provides:

$$\begin{aligned}
\vec{I}_{ref} T_s &= \int_0^{t_1} \vec{i}_{\alpha+} dt + \int_{t_2}^{t_3} \vec{i}_{\beta-} dt + \int_{t_4}^{t_5} \vec{i}_{\beta+} dt + \int_{t_6}^{t_7} \vec{i}_{\alpha-} dt \\
&= \int_0^{T_\alpha/2} \vec{i}_{\alpha+} dt + \int_0^{T_\beta/2} \vec{i}_{\beta-} dt + \int_0^{T_\beta/2} \vec{i}_{\beta+} dt + \int_0^{T_\alpha/2} \vec{i}_{\alpha-} dt \\
&= \int_0^{T_\alpha/2} \frac{2}{\sqrt{3}} \cdot \frac{1}{k} \left( I_{L0} + \frac{u_{L1}}{L_o} t \right) e^{j(\alpha\pi/3-\pi/6)} dt + \int_0^{T_\beta/2} \frac{2}{\sqrt{3}} \cdot \frac{1}{k} \left( I_{L2} + \frac{u_{L3}}{L_o} t \right) e^{j(\beta\pi/3-\pi/6)} dt + \\
&\quad \int_0^{T_\beta/2} \frac{2}{\sqrt{3}} \cdot \frac{1}{k} \left( I_{L4} + \frac{u_{L5}}{L_o} t \right) e^{j(\beta\pi/3-\pi/6)} dt + \int_0^{T_\alpha/2} \frac{2}{\sqrt{3}} \cdot \frac{1}{k} \left( I_{L6} + \frac{u_{L7}}{L_o} t \right) e^{j(\beta\pi/3-\pi/6)} dt \\
&= \int_0^{T_\alpha/2} \frac{2}{\sqrt{3}} \cdot \frac{1}{k} \left( I_{L0} + i_{L6} + \frac{2u_{L1}}{L_o} t \right) e^{j(\alpha\pi/3-\pi/6)} dt + \int_0^{T_\beta/2} \frac{2}{\sqrt{3}} \cdot \frac{1}{k} \left( I_{L2} + i_{L4} + \frac{2u_{L2}}{L_o} t \right) e^{j(\beta\pi/3-\pi/6)} dt \\
&= \frac{2}{\sqrt{3}} \cdot \frac{1}{k} \left( (I_{L0} + I_{L6}) \frac{T_\alpha}{2} + \frac{u_{L1}}{L_o} \left( \frac{T_\alpha}{2} \right)^2 \right) e^{j(\alpha\pi/3-\pi/6)} + \frac{2}{\sqrt{3}} \cdot \frac{1}{k} \left( (I_{L2} + I_{L4}) \frac{T_\beta}{2} + \frac{u_{L2}}{L_o} \left( \frac{T_\beta}{2} \right)^2 \right) e^{j(\beta\pi/3-\pi/6)}
\end{aligned} \qquad (21)$$

where ($\alpha$, $\beta$) can be (1,2) or (2,3) or (3,4) or (5,6) or (6,1), depending on which sector $\vec{I}_{ref}$ is located in. For example, if $\vec{I}_{ref}$ is located in sector I, ($\alpha$, $\beta$) will be (1,2).

Substituting $\vec{I}_{ref} = I_{ref} e^{j\theta}$ into equation (21), the dwell times can be calculated under the following three different cases.

Case 1: when the inductance $L_o \to \infty$ or the inductance $L_o$ is so large that the current ripple can be ignored so that $i_{L0} = i_{L2} = i_{L4} = i_{L6} = I_L$, then the dwell times are the same as the known SVM.

$$T_\alpha = mT_s \sin(\pi/6 - \theta) \qquad (22)$$

$$T_\beta = mT_s \sin(\pi/6 + \theta) \qquad (23)$$

$$T_0 = T_s - T_\alpha - T_\beta \qquad (24)$$

where the modulation index m is given by:

$$m = k \frac{I_{ref}}{I_L}, \qquad (25)$$

and $\theta$ is the angle between the reference current $\vec{I}_{ref}$ and the $\alpha$-axis as shown in FIG. 7.

In this case, the improved SVM according to various preferred embodiments of the present invention is consistent with the known SVM.

Case 2: When the inductance $L_o$ is very small or the load is very light, then the load-side can be in DCM mode. The dwell times are calculated as:

$$T_\alpha = 2\sqrt{\frac{kI_{ref} L_o T_s \sin(\pi/6 - \theta)}{u_{1\alpha}/k - u_o}} \qquad (26)$$

$$T_\beta = 2\sqrt{\frac{kL_o I_{ref} T_s \sin(\pi/6 + \theta)}{\beta_{1\beta}/k - u_o}} \qquad (27)$$

$$T_0 = T_s - T_\alpha - T_\beta \qquad (28)$$

where k is the transformer turns ratio, $L_o$ is the inductance of the load-side inductor $L_o$, $\vec{I}_{ref}$ is the magnitude of the vector $\vec{I}_{ref}$ and is determined by the controller, $T_s$ is the sampling period, $\theta$ is the angle between the reference current $\vec{I}_{ref}$ and the a-axis as shown in FIG. 7, $u_{1\alpha}$ is measured by the controller and corresponds to a line-to-line voltage depending on the switching state, $u_{1\beta}$ is measured by the controller and corresponds to a line-to-line voltage depending on the switching state, and $u_o$ is the output voltage as measured by the controller. The line-to-line voltages $u_{1\alpha}$ and $u_{1\beta}$ depend on the switching state. For example, in Sector I with active vectors $\vec{I}_1$ and $\vec{I}_2$, line-to-line voltages $u_{1\alpha}$ and $u_{1\beta}$ are $u_{ab}$ and $u_{ac}$, respectively.

Case 3: when in CCM operation and the current ripple cannot be ignored, then the dwell times are calculated as:

$$T_\alpha = \frac{-B + \sqrt{B^2 + AC \sin(\pi/6 - \theta)}}{A} \qquad (29)$$

$$T_\beta = \frac{-B + \sqrt{B^2 + AC \sin(\pi/6 - \theta)}}{A} \cdot \frac{\sin(\pi/6 + \theta)}{\sin(\pi/6 - \theta)} \quad (30)$$

$$T_0 = T_s - T_\alpha - T_\beta \quad (31)$$

where $$A = (4u_{1\alpha}/k - u_o) + (4u_{1\beta}/k - u_o)\frac{\sin(\pi/6 + \theta)}{\sin(\pi/6 - \theta)} \quad (32)$$

$$B = 2nL_oI_{L0} - 3u_oT_s/2 \quad (33)$$

$$C = 2n^2 kLI_{ref}T_s \quad (34)$$

where $u_{1\alpha}$ is measured by the controller and corresponds to a line-to-line voltage depending on the switching state, $u_{1\beta}$ is measured by the controller and corresponds to a line-to-line voltage depending on the switching state, k is the transformer turns ratio, $u_o$ is the output voltage as measured by the controller, θ is the angle between the reference current $\vec{I}_{ref}$ and the α-axis as shown in FIG. 7, $L_o$ is the inductance of the load-side inductor $L_o$, $I_{L0}$ is the current through inductor $L_o$ as measured by the controller at the beginning of the sampling period $T_s$, $T_s$ is the sampling period, and $I_{ref}$ is the magnitude of the vector $\vec{I}_{ref}$ and is determined by the controller. In one sampling period $T_s$, the vector $I_\alpha$ is divided to n equal parts. In this example, n is 2 because one sampling period includes $I_\alpha$ and $-I_\alpha$. If n=2, then B and C are provided by:

$$B = 4L_oI_{L0} 3u_oT_s/2 \quad (35)$$

$$C = 8kL_oI_{ref}T_s \quad (36)$$

FIGS. 9A, 9C, and 9E show waveforms of the isolated matrix rectifier shown in FIG. 1 in CCM using known SVM, and FIGS. 9B, 9D, and 9F show corresponding waveforms of the isolated matrix rectifier shown in FIG. 1 in CCM using SVM according to various preferred embodiments of the present invention. In FIGS. 9A and 9B, the load-side inductor current is continuous, so the isolated matrix rectifier is operating in CCM. FIGS. 9C and 9D show the waveforms in the time domain, and FIGS. 9E and 9F show the waveforms in the frequency domain. Comparing these figures demonstrates that the improved SVM according to various preferred embodiments of the present invention provide a line-side current with a better shaped waveform and with a smaller THD. The THD using the improved SVM was measured as 4.71% while the THD using the known SVM was measured as 7.59%, for example.

FIGS. 10A, 10C, and 10E show waveforms of the isolated matrix rectifier shown in FIG. 1 in DCM using known SVM, and FIGS. 10B, 10D, and 10F show corresponding waveforms of the isolated matrix rectifier shown in FIG. 1 in DCM using SVM according to various preferred embodiments of the present invention. In FIGS. 10A and 10, the load-side inductor current is discontinuous (i.e., the current is equal to zero), so the isolated matrix rectifier is operating in DCM. FIGS. 10C and 10D show the waveforms in time domain, and FIGS. 10E and 10F show the waveforms in the frequency domain. Comparing these figures demonstrates that the improved SVM according to various preferred embodiments of the present invention provide a line-side current with a better shaped waveform and with a smaller THD. The THD using the improved SVM was measured as 6.81% while the THD using known SVM was measured as 17.4%, for example.

Thus, the improved SVM according to various preferred embodiments of the present invention is capable of being used with the isolated matrix rectifier in FIG. 1 in both CCM and DCM operation. The line-side current THD is significantly reduced with the improved SVM compared to known SVM. The improved SVM is suitable for the compact and high-efficiency design with a wide-load range. The improved SVM can also be applied to current-source converter to improve the AC side current THD.

In the preferred embodiments of the present, to calculate the dwell times, the controller measures transformer primary current $i_p$ (or inductor current $I_L$), line voltages $u_a$, $u_b$, $u_c$, and output voltage $u_o$. The controller can be any suitable controller, including, for example, a PI controller, a PID controller, etc. The controller can be implemented in an IC device or a microprocessor that is programmed to provide the functions discussed above.

The same techniques and principles applied to the isolated matrix rectifier in FIG. 1 can also be applied to the current-source rectifier in FIG. 2 and to the current-source inverter in FIG. 3. These techniques and principles are not limited to the devices shown in FIGS. 1-3 and can be applied to other suitable devices, including, for example, non-isolated devices.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A converter comprising:
a transformer including primary windings and secondary windings;
switches connected to the primary windings;
an output inductor connected to the secondary windings; and
a controller connected to the switches; wherein
the controller turns the switches on and off based on dwell times calculated using space vector modulation with a reference current $\vec{I}_{ref}$ whose magnitude changes with time.

2. A converter of claim 1, wherein:
the switches include six switches;
the space vector modulation includes using six active switching states and three zero switching states;
a current space is divided into six sectors by the six active switching states such that a vector with θ=0 is located halfway between two of the active switching states; and
magnitudes of the six active switching states change with time.

3. A converter of claim 2, wherein:
the controller turns the six switches on and off based on dwell times that are calculated based on an ampere-second balance equation:

$$\vec{I}_{ref}T_s = \int_0^{T_\alpha} \vec{I}_\alpha dt + \int_0^{T_\beta} \vec{I}_\beta dt + \int_0^{T_0} \vec{I}_0 dt$$

where $\vec{I}_{ref} = I_{ref} e^{j\theta}$, θ is an angle between the reference current $\vec{I}_{ref}$ and the vector with θ=0, $T_s$ is a sampling period, $\vec{I}_\alpha$, $\vec{I}_\beta$, $\vec{I}_0$, are three nearest adjacent active vectors to $\vec{I}_{ref}$, and $T_\alpha$, $T_\beta$, $T_0$ are dwell times of $\vec{I}_\alpha$, $\vec{I}_\beta$, $\vec{I}_0$.

4. A converter of claim 3, wherein the controller turns the six switches on and off based on a vector sequence $\vec{I}_\alpha$, $\vec{I}_0$, $-\vec{I}_\beta$, $\vec{I}_0$, $\vec{I}_\beta$, $\vec{I}_0$, $-\vec{I}_\alpha$, $\vec{I}_0$, during the sampling period $T_s$.

5. A converter of claim 4, wherein the controller turns the six switches on and off based on a timing sequence $T_\alpha/2$, $T_0/4$, $T_\beta/2$, $T_0/4$, $T_\beta/2$, $T_0/4$, $T_\alpha/2$, $T_0/4$, during the sampling period $T_s$.

6. A converter of claim 4, wherein:
the controller calculates the dwell times using:

$$T_\alpha = \frac{-B + \sqrt{B^2 + AC \sin(\pi/6 - \theta)}}{A}$$

$$T_\beta = \frac{-B + \sqrt{B^2 + AC \sin(\pi/6 - \theta)}}{A} \cdot \frac{\sin(\pi/6 + \theta)}{\sin(\pi/6 - \theta)}$$

$$T_0 = T_s - T_\alpha - T_\beta$$

where $$A = (4u_{1\alpha}/k - u_o) + (4u_{1\beta}/k - u_o)\frac{\sin(\pi/6 + \theta)}{\sin(\pi/6 - \theta)}$$

$$B = 4L_o I_{L0} - 3u_o T_s/2$$

$$C = 8kL_o I_{ref} T_s$$

$u_{1\alpha}$ is a line-to-line voltage depending on the active switching state $\vec{I}_\alpha$, $u_{1\beta}$ is a line-to-line voltage depending on the active switching state $\hat{I}_\beta$, k is a transformer turns ratio, $u_o$ is an output voltage of the converter, $\theta$ is the angle between the reference current $\vec{I}_{ref}$ and the vector with $\theta=0$, $L_o$ is an inductance of the output inductor, $I_{L0}$ is the current through inductor $L_o$ at a beginning of the sampling period $T_s$, $T_s$ is the sampling period, and $I_{ref}$ is a magnitude of the vector $\vec{I}_{ref}$.

7. A converter of claim 4, wherein:
the controller calculates the dwell times using:

$$T_\alpha = 2\sqrt{\frac{kI_{ref} L_o T_s \sin(\pi/6 - \theta)}{u_{1\alpha}/k - u_o}}$$

$$T_\beta = 2\sqrt{\frac{kL_o I_{ref} T_s \sin(\pi/6 - \theta)}{u_{1\beta}/k - u_o}}$$

where k is a transformer turns ratio, $L_o$ is an inductance of the output inductor, $I_{ref}$ is the magnitude of the vector $\vec{I}_{ref}$, $T_s$ is the sampling period, $\theta$ is an angle between the reference current $\vec{I}_{ref}$ and the vector with $\theta=0$, $u_{1\alpha}$ is a line-to-line voltage depending on the active switching state $\vec{I}_\alpha$, $u_{1\beta}$ is a line-to-line voltage depending on the active switching state $\vec{I}_\beta$, and $u_o$ is an output voltage of the converter.

8. A converter of claim 1, wherein the converter is one of a matrix rectifier, a current-source rectifier, and a current-source inverter.

9. A converter of claim 1, wherein the converter is operated in a continuous-conduction mode.

10. A converter of claim 1, wherein the converter is operated in a discontinuous-conduction mode.

11. A space-vector-modulation method for a converter including a transformer with primary windings and secondary windings, switches connected to the primary windings, and an output inductor connected to the secondary windings, the space-vector-modulation method comprising:
turning the switches on and off based on dwell times calculated using space vector modulation with a reference current $\vec{I}_{ref}$ whose magnitude changes with time.

12. A method of claim 11, wherein:
the switches include six switches;
calculating the dwell times uses:
six active switching states and three zero switching states; and
a current space that is divided into six sectors by the six active switching states such that a vector with $\theta=0$ is located halfway between two of the active switching states; and
magnitudes of the six active switching states change with time.

13. A method of claim 12, wherein:
turning the six switches on and off is based on dwell times that are calculated based on an ampere-second balance equation:

$$\vec{I}_{ref} T_s = \int_0^{T_\alpha} \vec{I}_\alpha dt + \int_0^{T_\beta} \vec{I}_\beta dt + \int_0^{T_0} \vec{I}_0 dt$$

where $\vec{I}_{ref} = I_{ref} e^{j\theta}$, $\theta$ is an angle between the reference current $\vec{I}_{ref}$ and the vector with $\theta=0$, $T_s$ is a sampling period, $\vec{I}_\alpha$, $\vec{I}_\beta$, $\vec{I}_0$, are three nearest adjacent active vectors to $\vec{I}_{ref}$, and $T_\alpha$, $T_\beta$, $T_0$ are dwell times of $\vec{I}_\alpha$, $\vec{I}_\beta$, $\vec{I}_0$.

14. A method of claim 13, wherein turning the six switches on and off is based on a vector sequence $\vec{I}_\alpha$, $\vec{I}_0$, $-\vec{I}_\beta$, $\vec{I}_0$, $\vec{I}_\beta$, $\vec{I}_0$, $-\vec{I}_\alpha$, $\vec{I}_0$, during the sampling period $T_s$.

15. A method of claim 14, wherein turning the six switches on and off is based on a timing sequence $T_\alpha/2$, $T_0/4$, $T_\beta/2$, $T_0/4$, $T_\beta/2$, $T_0/4$, $T_\alpha/2$, $T_0/4$, during the period $T_s$.

16. A method of claim 14, wherein:
the dwell times are calculated using:

$$T_\alpha = \frac{-B + \sqrt{B^2 + AC \sin(\pi/6 - \theta)}}{A}$$

$$T_\beta = \frac{-B + \sqrt{B^2 + AC \sin(\pi/6 - \theta)}}{A} \cdot \frac{\sin(\pi/6 + \theta)}{\sin(\pi/6 - \theta)}$$

$$T_0 = T_s - T_\alpha - T_\beta$$

where $$A = (4u_{1\alpha}/k - u_o) + (4u_{1\beta}/k - u_o)\frac{\sin(\pi/6 + \theta)}{\sin(\pi/6 - \theta)}$$

$$B = 4L_o I_{L0} - 3u_o T_s/2$$

$$C = 8kL_o I_{ref} T_s$$

$u_{1\alpha}$ is a line-to-line voltage depending on the active switching state $\vec{I}_\alpha$, $u_{1\beta}$ is a line-to-line voltage depending on the active switching state $\hat{I}_\beta$, k is a transformer turns ratio, $u_o$ is an output voltage of the converter, $\theta$ is the angle between the reference current $\vec{I}_{ref}$ and the vector with $\theta=0$, $L_o$ is an inductance of the output inductor, $I_{L0}$ is the current through inductor $L_o$ at a beginning of the sampling period $T_s$, $T_s$ is the sampling period, and $I_{ref}$ is a magnitude of the vector $\vec{I}_{ref}$.

17. A method of claim 14, wherein:
the controller calculates the dwell times using:

$$T_\alpha = 2\sqrt{\frac{kI_{ref}L_o T_s \sin(\pi/6 - \theta)}{u_{1\alpha}/k - u_o}}$$

$$T_\beta = 2\sqrt{\frac{kL_o I_{ref} T_s \sin(\pi/6 + \theta)}{u_{1\beta}/k - u_o}}$$

where k is a transformer turns ratio, $L_o$ is an inductance of the output inductor, $I_{ref}$ is the magnitude of the vector $\vec{I}_{ref}$, $T_s$ is the sampling period, $\theta$ is an angle between the reference current $\vec{I}_{ref}$ and the vector with $\theta=0$, $u_{1\alpha}$ is a line-to-line voltage depending on the active switching state $\vec{I}_\alpha$, $u_{1\beta}$ is a line-to-line voltage depending on the active switching state $\vec{I}_\beta$, and $u_o$ is an output voltage of the converter.

18. A method of claim 11, wherein the converter is one of a matrix rectifier, a current-source rectifier, and a current-source inverter.

19. A method of claim 11, further comprising operating the converter in a continuous-conduction mode.

20. A method of claim 11, further comprising operating the converter in a discontinuous-conduction mode.

* * * * *